(12) United States Patent
Jammoul et al.

(10) Patent No.: US 10,744,885 B2
(45) Date of Patent: Aug. 18, 2020

(54) BATTERY PRE-HEATING PRIOR TO FAST CHARGE

(71) Applicant: Ford Global Technologies, LLC, Dearborn, MI (US)

(72) Inventors: Jacqueline Jammoul, Plymouth, MI (US); Chi Paik, Grosse Ile, MI (US); Joseph F. Freiman, Walled Lake, MI (US); Venkateswara Anand Sankaran, Farmington Hills, MI (US); Robert Taenaka, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 768 days.

(21) Appl. No.: 15/357,142

(22) Filed: Nov. 21, 2016

(65) Prior Publication Data
US 2018/0141458 A1  May 24, 2018

(51) Int. Cl.
*H02J 7/00* (2006.01)
*B60L 11/18* (2006.01)
*H01M 10/625* (2014.01)
*H01M 10/44* (2006.01)
*H01M 10/613* (2014.01)
*B60L 53/60* (2019.01)
*B60L 58/27* (2019.01)
*H01M 10/63* (2014.01)
(Continued)

(52) U.S. Cl.
CPC ........... *B60L 11/1874* (2013.01); *B60L 53/60* (2019.02); *B60L 58/12* (2019.02); *B60L 58/26* (2019.02); *B60L 58/27* (2019.02); *H01M 10/44* (2013.01); *H01M 10/613* (2015.04); *H01M 10/615* (2015.04); *H01M 10/625* (2015.04); *H01M 10/63* (2015.04); *H02J 7/0021* (2013.01); *B60L 2240/545* (2013.01); *B60L 2260/56* (2013.01); *H01M 2220/20* (2013.01); *Y02T 10/705* (2013.01); *Y02T 10/7005* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC ...... H02J 7/0021; H01M 10/60; H01M 10/61; H01M 10/613; H01M 10/615; B60L 58/24; B60L 58/25; B60L 58/26; B60L 58/27
USPC .......................................... 320/109, 150–154
See application file for complete search history.

(56) References Cited

U.S. PATENT DOCUMENTS 7,741,816 B2  6/2010  Kelty et al.
9,276,293 B2  3/2016  Xu
(Continued)

OTHER PUBLICATIONS

Leng, Feng et al, "Effect of Temperature on the Aging rate of Li Ion battery Operating above Room Temperature", Sci. Rep. 5, 12967, Published Aug. 6, 2015, 12 pages, doi: 10.1038/srep12967 (2015).

*Primary Examiner* — Nathaniel R Pelton
(74) *Attorney, Agent, or Firm* — David Kelley; Brooks Kushman, P.C.

(57) ABSTRACT

A vehicle includes a thermal system for a battery; and a controller for the thermal system. The controller may be configured to, during vehicle motion, cool the battery when a temperature of the battery exceeds a lower threshold and inhibit transfer of power with the battery when the temperature exceeds an upper threshold, and while coupled with a charge station, heat the battery to a temperature between the lower threshold and the upper threshold.

19 Claims, 3 Drawing Sheets

(51) Int. Cl.
  *B60L 58/12*   (2019.01)
  *H01M 10/615*  (2014.01)
  *B60L 58/26*   (2019.01)

(56) References Cited

U.S. PATENT DOCUMENTS

| | | | |
|---|---|---|---|
| 2010/0012295 A1* | 1/2010 | Nemesh | B60H 1/00278 |
| | | | 165/104.19 |
| 2013/0207617 A1* | 8/2013 | Houchin-Miller | B60L 3/0076 |
| | | | 320/150 |
| 2013/0337330 A1 | 12/2013 | Taniguchi et al. | |
| 2014/0009113 A1* | 1/2014 | Robins | B60L 11/1809 |
| | | | 320/109 |
| 2014/0012445 A1* | 1/2014 | Fleckenstein | H01M 10/486 |
| | | | 701/22 |
| 2014/0012447 A1* | 1/2014 | Gao | B60L 11/1874 |
| | | | 701/22 |
| 2015/0123481 A1* | 5/2015 | Reihlen | H02J 7/0024 |
| | | | 307/80 |
| 2016/0059733 A1* | 3/2016 | Hettrich | H04W 4/029 |
| | | | 701/2 |
| 2017/0080821 A1* | 3/2017 | Hughes | B60L 58/26 |
| 2018/0043785 A1* | 2/2018 | Takatsuka | H01M 10/42 |

* cited by examiner

FIG. 5

BATTERY PRE-HEATING PRIOR TO FAST CHARGE

TECHNICAL FIELD

This application is generally related to a battery controller for a vehicle that pre-heats a traction battery to a temperature greater than an active cooling threshold prior to preforming a fast charge.

BACKGROUND

Electrified vehicles including Hybrid Electric Vehicles (HEVs), Pug-in Hybrid Electric Vehicles (PHEVs) and Battery Electric Vehicles (BEVs) rely on a traction battery to provide power to an inverter which converts direct current (DC) power to alternating current (AC) power. The AC power is then directed to a traction motor to propel the vehicle. The typical AC traction motor is a 3-phase motor that may be powered by 3 sinusoidal signals each driven with 120 degrees phase separation. The traction battery is configured to operate in a particular voltage and current range. The kinetic energy of the vehicle can be recaptured during deceleration and braking by this same electric motor, or a second electric machine, and converted to electric power. Power (kW) that is integrated over time is energy (kWh). This recovered energy can be stored in the battery for future use by the vehicle. A traction battery that operates at a voltage greater than 60 Volts DC is alternatively referred to as a high-voltage battery. The product of the operating voltage and operating current of the traction battery represents the electrical power that is sourced from the battery during a discharge event or sunk to the battery during a charge event.

SUMMARY

A vehicle includes a thermal system for a battery; and a controller for the thermal system. The controller may be configured to, during vehicle motion, cool the battery when a temperature of the battery exceeds a lower threshold and inhibit transfer of power with the battery when the temperature exceeds an upper threshold, and while coupled with a charge station, heat the battery to a temperature between the lower threshold and the upper threshold.

A method of controlling a vehicle traction battery includes, while in a key-on state, activating a battery cooler when a temperature of the battery is above a lower threshold, and restricting power transferred with the battery when the temperature is above an upper threshold; and while coupled with a charge station, pre-heating the battery to a temperature between the lower threshold and the upper threshold prior to flowing a current to the battery.

A battery system includes a battery; and a controller. The controller may be configured to in response to a temperature of the battery exceeding an upper threshold during vehicle motion, inhibit transfer of power with the battery, and in response to the battery being coupled with a charge station, heat the battery to a temperature between a lower threshold and the upper threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Lithium-ion cells have become a popular energy source for PHEVs and BEVs because they provide high energy density (Wh/l), high power density (W/l) and high cycle life in comparison to other battery technologies at a given cost. Batteries made of a multiplicity of these cells, configured in series or parallel/series arrangements, are able to meet the power and energy requirements of automotive applications. The durability of such a battery is very dependent upon the temperature at which the battery is operated as well as the charge and discharge power demands placed upon the battery. Durability is quantified by measuring the capacity retention as a function of cycle number and the power capability as a function of cycle number. Increased battery resistance is a proxy for diminished power capability. Although a lithium-ion battery may be operated over a broad temperature range (e.g., −30-50° C.), power and voltage limitations would have to be imposed at the extremes of this range. Optimum durability is achieved when operated over a much narrower nominal temperature range (e.g. 20-45° C.).

Based on the industry knowledge presented above, when a temperature of the vehicle traction battery increases above a lower active cooling threshold, (e.g., 35° C.), active cooling of the battery occurs. The active cooling may be from an external cooling loop that circulates a fluid (e.g., air or liquid) across components of the battery within the battery pack. The fluid may then be passed through either a radiator or a compressor/evaporator/radiator combination to remove heat from the battery thereby cooling the battery. If the temperature of the battery increases beyond an upper active cooling threshold (e.g., 45° C.), the battery input and output power capability is reduced to minimize any further resistive heating, also referred to as $I^2R$ heat generation, within the battery. If the battery were to reach a maximum temperature limit (e.g., 55°), the battery could be electrically disconnected from any charging or load circuits to prevent any further $I^2R$ heating and to allow the cooling system to bring the battery temperature back into an acceptable operating range.

Here, a vehicle traction battery is heated to a temperature above the lower active cooling threshold and less than the upper active cooling threshold, where power limitations are imposed, prior to charging. While the temperature is between the lower and upper thresholds, the battery may be fast-charged at a rate greater than 1 C (see definition below). Further, it has been observed that while a battery is being fast-charged at a rate greater than 1 C at this elevated temperature, the capacity retention vs. cycle number for the battery is increased and the discharge resistance vs. cycle number for the battery is decreased when compared to batteries cycled under the same conditions at lower temperatures.

The "C rate" is defined as a current value measured in Amps (A) that is numerically equivalent to the capacity value of a cell measured in Amp-Hours (Ah). Thus, the C-rate for a 10 Ah cell is 10 A, and the C-rate for a 1 Ah cell is 1 A. This provides a means of normalizing charge and discharge times for cells of various sizes. For example, consider a 10 Ah and a 1 Ah cell in which both cells are fully charged. Both cells will be completely discharged in 1 hour if the 10 Ah cell is discharged at 10 A (1 C), and the 1 Ah cell is discharged at 1 A (1 C). To date, typical PHEV and BEV charging systems operate at less than the 1 C rate.

A discharge rate of 1 C is also known as a one-hour discharge; 0.5 C or C/2 is a two-hour discharge and 0.2 C or C/5 is a 5-hour discharge. Likewise, a charge rate of 1 C is known as a one-hour charge rate; 2 C is a 30 minute charge rate and 3 C is a 20 minute charge rate. For lithium ion cells, actual charge times will be longer than indicated because the current must be reduced near the top of charge in order to not exceed the maximum voltage of the cell. Charging at greater than the 1 C rate is considered a "fast-charge". Some high-performance batteries can be charged and discharged above 1 C with moderate impact to durability. The durability is especially negatively impacted when lithium-ion cells are charged at multiple C rates and at ambient temperatures below 25° C.

In a similar manner the power in watts (W) that is numerically equivalent to the energy value in watt-hours (Wh) could be considered the 1 C rate. In other words, if a 10 kWh battery is discharged at 10 kW, it will be depleted in about 1 hour. In general, battery cycle life has been identified to be a function of many aspects including; a type of lithium ion cell (e.g., cell designs and cell chemistry), an ambient temperature, a charge and discharge rate at which the cycling occurred and the state-of-charge (SOC) operating window (e.g., SOC swing). The SOC of a battery, reported in percent, is the ratio of the remaining capacity of a battery at its present state divided by the rated capacity for the battery when fully charged and discharged under specified conditions. The actual cell temperature is related to the ambient temperature and may vary through a charge/discharge cycle due to $I^2R$ heating of the cell. Generally the difference between cell temperature and ambient temperature is about 2-15° C. above the ambient temperature, depending upon the charge/discharge rate.

As both the public and private electric vehicle charging infrastructure develops, higher power output charging systems are becoming available. This is exemplified by the advent of DC fast charging stations, which can provide up to 120 kW of DC power at 400 VDC. Depending upon the size of the vehicle traction battery, this represents a charging opportunity at a multiple C rate that could significantly reduce the time required to completely recharge the battery. To take full advantage of such a high power charging system, proper pre-conditioning of the battery pack is needed so that the deleterious effects of charging at a multiple C rate are minimized.

Figure 3:
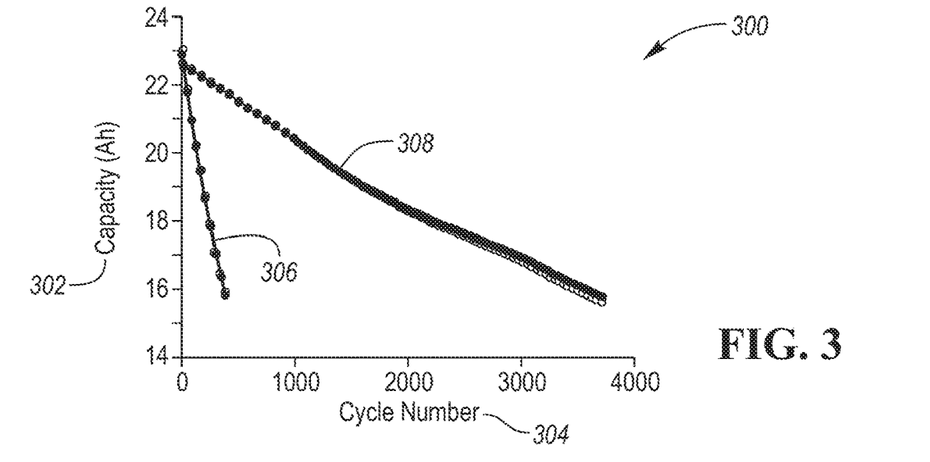
FIG. 3 is a graphical representation of capacity retention vs. cycle number for a traction battery subjected to a 3.5 C fast charge at two different ambient temperatures.
Figure 4:
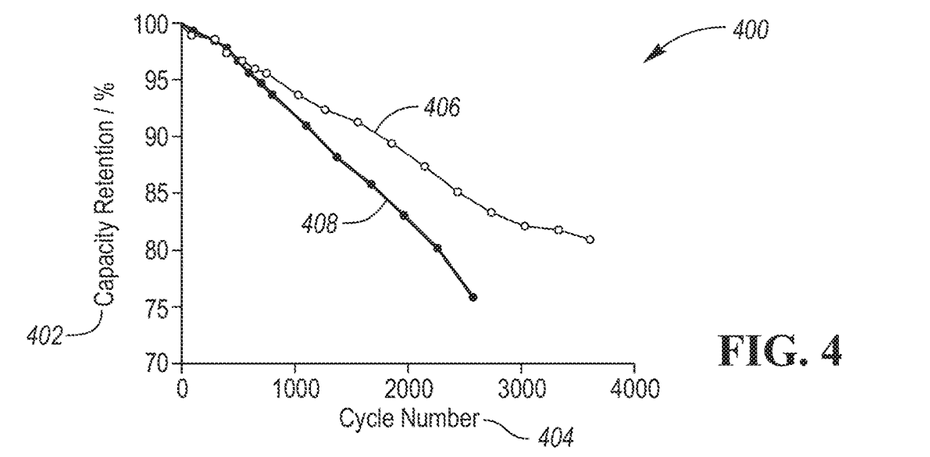
FIG. 4 is a graphical representation of capacity retention vs. cycle number for a traction battery subjected to 1.5 C fast charge at two different ambient temperatures.

Here, a controller is configured to allow fast charging at a rate greater than 1 C if the battery is pre-conditioned to an elevated temperature. Our results show that a longer cycle life is achieved by this action when compared to fast charging at a similar rate but at a lower temperature. The fast charging is tuned for the battery chemistry. The degree of cycle life improvement is proportional to the difference between the lower and upper ambient cycling temperatures for which the comparison is made, and the absolute cycle numbers are inversely proportional to fast charge rates being compared (FIG. 3 and FIG. 4). The improved charge reaction kinetics at elevated temperature appear to outweigh the deleterious effects of operating at elevated temperature. Similarly, the power capability of the battery as a function of cycle number is improved when fast charged at an elevated temperature. This is evident from the reduced resistance increase shown in FIG. 5 for the battery fast charged at an elevated temperature.

There is a fair amount of data in the literature supporting the fact that lithium-ion reaction kinetics are greatly reduced at sub-room temperature and that the cell is at risk of having metallic lithium plated on the anode if fast charged at low temperatures. The presence of metallic lithium dendrites in the cell poses the risk of developing an internal short circuit.

In general, traction batteries for automotive vehicles are designed with different specifications. For example, a typical traction battery for a standard full hybrid electric vehicle (FHEV) (e.g., gasoline engine in combination with an electric machine configured to provide propulsion) may have a multiplicity of lower capacity cells (e.g., 5 Ah cells) configured to provide an energy storage capability of ~1.3 KWatt·Hour at a nominal voltage of ~250V. However, a FHEV may have a terminal voltage of 100, 150, 200V or greater. FHEV batteries are often optimized for their power capability. Thus, such 5 Ah cells might be discharged and charged at 100 A, or the 20 C rate which is equivalent to a 25 kW rate, during vehicle acceleration and deceleration. However, FHEV batteries are not configured to accept a charge from the electric grid.

Another example is a traction battery for a plug-in hybrid electric vehicle (PHEV). These battery packs may be designed to provide propulsion to the vehicle via electricity only for a limited range (e.g., 15-20 miles) and may have a multiplicity of higher capacity cells (e.g., 20, 25, or 30 Ah) configured to provide an energy storage capability of ~7.5 KWatt·hour at ~300 V. However, a PHEV may have a terminal voltage of 100, 150, 200V or greater. PHEV batteries are optimized to provide a balance between power capability and energy storage capability. A typical average discharge rate could be the 3 C rate (~75 A), but the battery can tolerate short duration discharge rates of up to 5 C rate. However the charge rate is often limited to about the 1 C rate (~25 A). Here, when the battery is used as the sole power source for the vehicle, I2R heat generation causes the battery temperature to increase and a cooling system is activated when the temperature of the battery exceeds the lower threshold (e.g., 35° C.). In anticipation of arriving at a destination that has a charging system, a battery controller may turn-off the battery cooler if the battery is above the lower threshold, or if the battery is below the lower threshold, the controller may activate a battery heater to heat the battery to a range between the lower and upper threshold. At this point, the battery controller may pre-condition the battery temperature to accept a fast charge at an increased rate, such as 3.5 C. The fast charge may continue until the battery reaches an upper SOC limit where charging power must be reduced to avoid exceeding a maximum cell or battery voltage. The battery controller may also monitor the battery temperature and exercise control of the cooling system to ensure that the battery stays below its maximum operating temperature. When the battery reaches a pre-defined lower SOC limit (e.g., 20% SOC), the control system blends power from the battery and the internal combustion engine like a FHEV and does not allow the battery to go below a minimum SOC. However, when connected to the grid for recharging, the continuous charge rate for a PHEV battery is typically limited to about 1 C. Also, when the battery temperature is above the lower threshold at which point battery cooling is inhibited while charging, a controller may be further configured to activate battery cooling when the battery temperature approaches the upper threshold. For example, while the battery is charging and the battery temperature is above the lower threshold, battery cooling is inhibited until the battery temperature approaches the upper threshold, in which approaching the upper threshold may include being a small percentage (e.g., 1%, 2%, 3%, 4%, or 5%) above which battery cooling is activated.

Here, while the battery is used as the sole power source for the vehicle during the all-electric portion of the drive, I2R heat generation causes the battery temperature to increase and a cooling system is activated when the battery temperature exceeds the lower threshold (e.g., 35° C.). In anticipation of arriving at a destination that has a charging system, a battery controller may turn-off the battery cooler if the battery is above the lower threshold, or if the battery is below the lower threshold, the controller may activate a battery heater to heat the battery to a range between the lower and upper threshold. At this point, the battery controller may pre-condition the battery temperature to accept a fast-charge at an increased rate, such as 3.5 C. The fast-charge may continue until the battery reaches an upper SOC limit where charging power must be reduced to avoid exceeding a maximum cell or battery voltage. The battery controller may also monitor the battery temperature and exercise control of the cooling system to ensure that the battery stays below its maximum operating temperature.

A third example is a traction battery for a battery electric vehicle (BEV). These battery packs may be designed to provide only electric propulsion to the vehicle for an extended range (e.g., 100 miles or more). Such a battery might be comprised of a multiplicity of cells (e.g., 10 or 15 Ah or larger cells) configured to provide an energy storage capability of ~23 KWatt·hour, or more, at a nominal voltage of ~300 V. However, a BEV may have a terminal voltage of 100, 150, 200V or greater. In order to achieve the energy storage capability referenced above, five 15 Ah cells may be connected in parallel to provide an effective battery pack capacity of 75 Amp·hours. These groups of parallel connected cells are then connected in series to arrive at the target nominal voltage for the battery pack. The BEV battery is designed to typically operate at low C rates (~C/3 rate) with short bursts of higher rates such up to 3 C. Charge rates are typically limited to less than 1 C.

When a PHEV or BEV is charged, it is typically charged at a fractional C rate, depending upon the limitations imposed by the onboard vehicle charger and the grid connected power source available to the user. This generally means that several hours are required to fully recharge a depleted battery.

Generally, a battery may be heated by either self-heating, which is simply a function of its internal resistance in which $P=I^2R$, or the application of external heat. External heaters may utilize the air of the passenger compartment to maintain or regulate the battery temperature, or an external heater may utilize a fluid to heat or cool battery components within the battery pack. Typically when a battery is operating it generates enough heat through operations that cooling is required when the battery exceeds the lower active cooling threshold. Here, a battery controller may be configured to stop cell cooling in anticipation of a future fast charge, or start cell heating prior to fast charge. For example, a system such as a navigation system that is in communication with the battery controller may have information regarding a current location, a destination location, and accessibility of a charge station at the destination location. If the drive is 20 miles away and the battery controller predicts that the battery will decrease in SOC and increase in temperature from the current SOC of 68% and temperature of 25° C. to a predicted SOC of 24% at 38° C. at the destination location, the battery controller may inhibit active cooling of the battery such that the battery may arrive at the location with the battery heated to facilitate fast charging.

Figure 1:
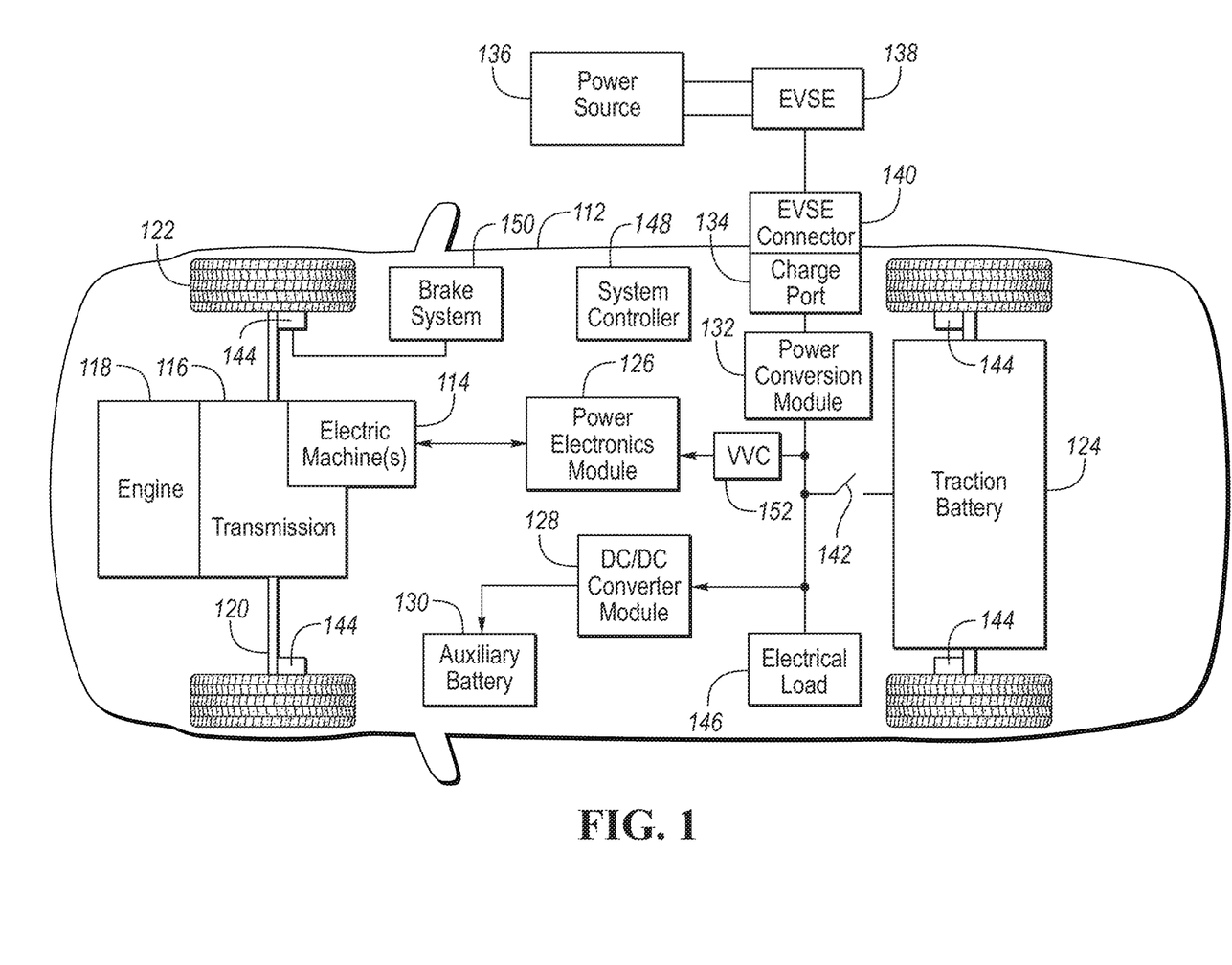
FIG. 1 is a diagram of a hybrid vehicle illustrating typical drivetrain and energy storage components with a variable voltage converter and power inverter therebetween.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. Although shown as a single contactor, the contactors 142 may include multiple contactors such as a positive and negative contactor to isolate the traction battery 124. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function. Also, in high voltage automotive systems, re-generative braking may utilize the electric machine 114, in which the brake controller 150 may blend friction brakes and the electric machine.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

In addition to illustrating a plug-in hybrid vehicle, FIG. 1 can illustrate a battery electric vehicle (BEV) if engine 118 is removed. Likewise, FIG. 1 can illustrate a traditional hybrid electric vehicle (FHEV) such as a power-split hybrid electric vehicle if components 136, 138, 140 and 134 are removed. FIG. 1 also illustrates the high voltage vehicle system which includes the electric motor(s) 114, the power electronics module 126, the DC/DC converter module 152, the power conversion module 132, and the battery pack 124.

Typically, vehicle operation occurs when the vehicle is in one of three states of operation. The three states of operation are key-on, key-off, and accessory. These three states are based on historical operation in which a physical key was inserted into an ignition switch and rotated. Historically, the rotating key switch may have also included a momentary contact for "start" that was used to momentarily supply power to a starter motor, after the key would return to the key-on condition that having all modules powered and active. Once a key was inserted into the ignition, the key was rotated through the accessory and key-on contact. The accessory position typically has limited modules powered, for example, the accessory position may only provide power to a radio and electric windows, however often in this mode, the engine is shut-off and the steering is locked. A key-off condition is a condition in which most modules are not powered, during key-off only a limited number of modules were powered, for example, in some vehicles; the only module powered was an electric clock. In current vehicle systems, most modules always have power applied to them and they either power themselves up or down based on message communicated between modules. The key-on condition is the condition that powers up all modules and is the condition that allows the engine and steering wheel to operate.

Figure 2:
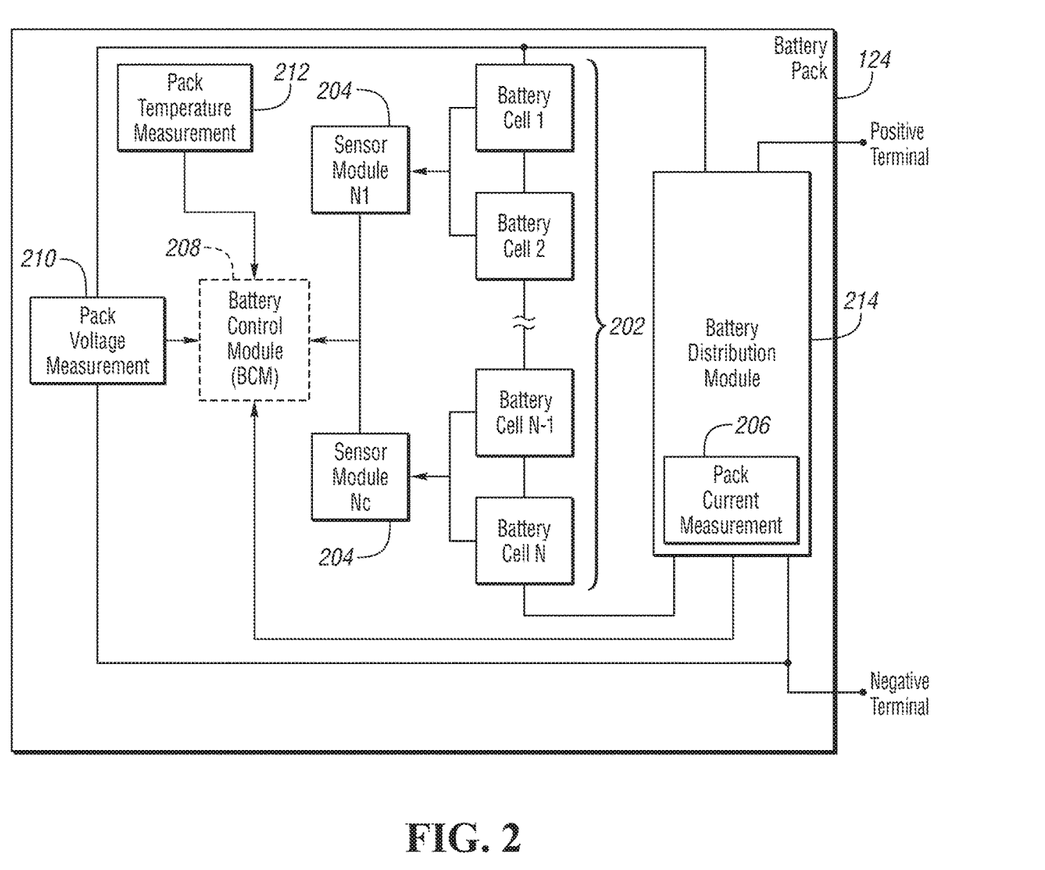
FIG. 2 is a block diagram of a battery configuration illustrating battery cells, battery cell monitoring components and controlling systems.

The individual battery cells within a battery pack may be constructed from a variety of chemical formulations. Typical battery pack chemistries may include but are not limited to lead acid, nickel cadmium (NiCd), nickel-metal hydride (NIMH), Lithium-Ion or Lithium-Ion polymer. FIG. 2 shows a typical battery pack 124 in a simple series configuration of N battery cell modules 202. The battery cell modules 202 may contain a single battery cell or multiple battery cells electrically connected in parallel and/or series. The battery pack, however, may be composed of any number of individual battery cells and battery cell modules connected in series or parallel or some combination thereof. A typical system may have one or more controllers, such as a Battery Control Module (BCM) 208 that may also be referred to as a Battery Energy Control Module (BECM) that monitors and controls the performance of the battery pack 124. The BECM 208 may monitor several battery pack level characteristics such as pack current measured by a current sensor 206, pack voltage 210 and pack temperature 212.

In addition to the pack level characteristics, there may be battery cell level characteristics that need to be measured and monitored. For example, the terminal voltage, current, and temperature of each cell may be measured. A system may use a sensor module 204 to measure the characteristics of one or more battery cell modules 202. The characteristics may include battery cell voltage, temperature, age, number of charge/discharge cycles, etc. Typically, a sensor module will measure battery cell voltage. Battery cell voltage may be voltage of a single cell or of a group of cells electrically connected in parallel or in series. The battery pack 124 may utilize up to $N_c$ sensor modules 204 to measure the characteristics of all the battery cells 202. Each sensor module 204 may transfer the measurements to the BECM 208 for further processing and coordination. The sensor module 204 may transfer signals in analog or digital form to the BCM 208. The battery pack 124 may also contain a battery distribution module (BDM) 214 which enables the flow of current into and out of the battery pack 200.

In another embodiment, the battery pack voltage is not directly measured. Here, the battery pack voltage is a sum of individual cell voltages. The numbering of the battery cells may increase from 1 to N in ascending order starting at the negative terminal and working toward the positive terminal. Also, the names of modules are provided as an example, other names and architectures may be used to implement the concepts of this application. For example, the a Battery Control Module (208) may be referred to as a Battery Energy Control Module (BECM), or the Battery Distribution Module (214) may be referred to as a Bussed Electrical Center (BEC).

FIG. 3 is a graphical representation 300 of a capacity 302 of a traction battery in relation to a number of cycles 304. Four 25 Ah PHEV lithium ion cells were charged at 3.5 C for 20 minutes, rested for 5 minutes, then discharged at 2 C to a 2.5 V cutoff and rested for 5 minutes. This cycling was repeated continuously, and the delivered capacity is plotted vs. cycle number. The 42° C. line represented by 308 represents two cells that were cycled at 42° C., and 15° C. line 306 represents two cells that were cycled at 15° C.

FIG. 4 is a graphical representation 400 of a capacity retention percentage 402 of a traction battery in relation to a number of cycles 404. Two 5P4S, 15 Ah BEV cell modules, of a slightly different lithium ion chemistry than that represented by FIG. 4, were fast charged at 1.5 C rested, discharged at 2 C to 2.85 V and rested. This cycling was repeated continuously, and the delivered capacity was reported as a percentage of the initial capacity vs. cycle number. The 45° C. line 406 illustrates the relationship after being cycled at 45° C. and 25° C. line 408 illustrates the relationship after being cycled at 25° C.

Figure 5:
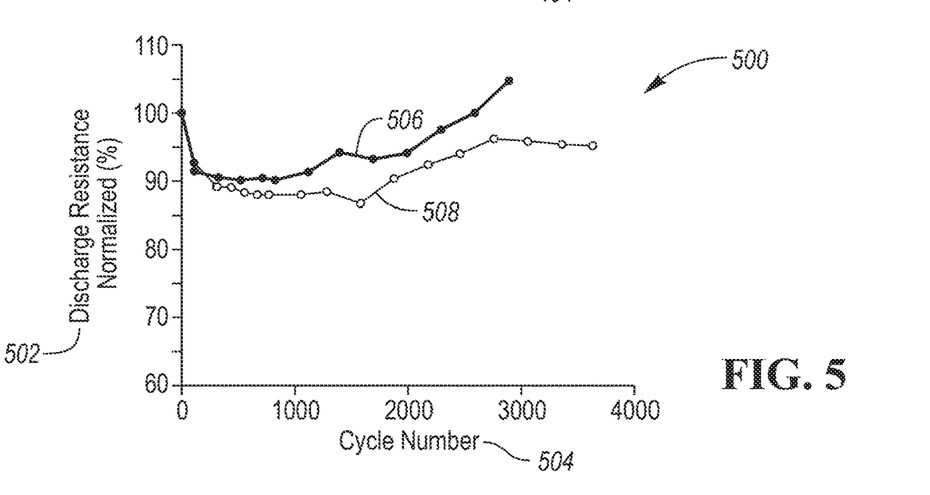
FIG. 5 is a graphical representation of a normalized discharge resistance vs. cycle number for a traction battery subjected to 1.5 C fast charge at two different ambient temperatures.

FIG. 5 is a graphical representation 500 of a normalized discharge resistance 502 of a traction battery in relation to a number of cycles 504. The resistance of the same two 5P4S 15 Ah BEV cell modules that were used in FIG. 4 is plotted vs. cycle number. The plot is represented by a 25° C. line 506 that was cycled at 25° C. and a 45° C. line 508 that was cycled at 45° C. This empirical data confirms the operation of the systems and methods described above.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a thermal system for a battery; and
   a controller for the thermal system configured to, during vehicle motion, cool the battery when a temperature of the battery exceeds a lower threshold and inhibit transfer of power with the battery when the temperature exceeds an upper threshold, and while coupled with a charge station, heat the battery to a start temperature between the lower threshold and the upper threshold prior to flowing a current to the battery.

2. The vehicle of claim 1, wherein the controller is further configured to, while coupled with a charge station, pre-heat the battery to a temperature less than the upper threshold by an amount the battery is predicted to rise.

3. The vehicle of claim 1, wherein the controller is further configured to, during vehicle motion and a predicted arrival at a charge station at which a sum of a predicted change in temperature of the battery and a current battery temperature falls between the lower threshold and the upper threshold, inhibit cooling the battery.

4. The vehicle of claim 3, wherein the controller is further configured to inhibit cooling the battery to permit the temperature of the battery to increase to a level less than the upper threshold by an amount the battery is predicted to rise while coupled with the charge station.

5. The vehicle of claim 3, wherein the controller is further configured to inhibit cooling the battery to permit the temperature of the battery to increase to a level less than the upper threshold by an amount the battery is predicted to rise while coupled with the charge station, and activate a cooling system when the battery temperature is within a predetermined amount of the upper threshold.

6. The vehicle of claim 1, wherein the battery includes a plurality of cells having a combined capacity of at least 50 Ah, and the controller is further configured to limit a flow of charge from a charge station to the battery to a rate greater than 1C.

7. The vehicle of claim 1, wherein the battery includes a plurality of cells having a combined capacity of at least 20 Ah, and the controller is further configured to limit a flow of charge from a charge station to the battery to a rate greater than 1C.

8. The vehicle of claim 1, wherein the controller is further configured to adjust a rate at which charge is provided to the battery as a function of a state of charge (SOC) of the battery such that the rate decreases as the SOC increases.

9. A method of controlling a vehicle traction battery comprising:

while in a key-on state, activating a battery cooler when a temperature of the battery is above a lower threshold, and restricting power transferred with the battery when the temperature is above an upper threshold; and while coupled with a charge station, pre-heating the battery to a start temperature between the lower threshold and the upper threshold prior to flowing a current to the battery wherein the start temperature is based on an amount the battery is predicted to rise while coupled with the charge station.

10. The method of claim 9, wherein the pre-heating includes disengaging a battery cooler when the battery is above the lower threshold.

11. The method of claim 9, wherein the pre-heating the battery includes engaging a battery heater when the battery is above the lower threshold.

12. The method of claim 9, wherein the vehicle traction battery has a terminal voltage of at least 60V DC and includes a plurality of cells each having a combined capacity of at least 50 Ah.

13. The method of claim 9, wherein the vehicle traction battery has a terminal voltage of at least 60V DC and includes a plurality of cells each having a combined capacity of at least 20 Ah.

14. A battery system comprising:
a battery; and
a controller configured to
in response to a temperature of the battery exceeding an upper threshold during vehicle motion, inhibit transfer of power with the battery,
in response to the battery being coupled with a charge station, heat the battery to a start temperature between a lower threshold and the upper threshold, wherein the start temperature is based on an amount the battery is predicted to rise while coupled with the charge station, and
in response to the temperature exceeding the lower threshold during vehicle motion, cool the battery.

15. The battery system of claim 14, wherein inhibiting transfer of power with the battery includes outputting a signal to open switches coupled between the battery and loads of the battery.

16. The battery system of claim 14, wherein the controller is further configured to, during vehicle motion and a predicted arrival at a charge station at which a sum of a predicted change in temperature of the battery and a current battery temperature falls between the lower threshold and the upper threshold, inhibit cooling the battery to allow self-heating of the battery.

17. The battery system of claim 16, wherein the controller is further configured to inhibit cooling the battery to permit the temperature of the battery to increase to a level less the upper threshold by an amount the battery is predicted to rise while coupled with the charge station.

18. The battery system of claim 16, wherein the controller is further configured to inhibit cooling the battery to permit the temperature of the battery to increase to a level less than the upper threshold by an amount the battery is predicted to rise while coupled with the charge station and activate a cooling system when the battery temperature is within a predetermined amount of the upper threshold.

19. The battery system of claim 14, wherein heating the battery includes activating a battery heater.

\* \* \* \* \*